Aug. 13, 1946.   W. M. FLETCHER   2,405,781
PIE CRUST OR LIKE FORMER
Filed April 7, 1945   3 Sheets-Sheet 1
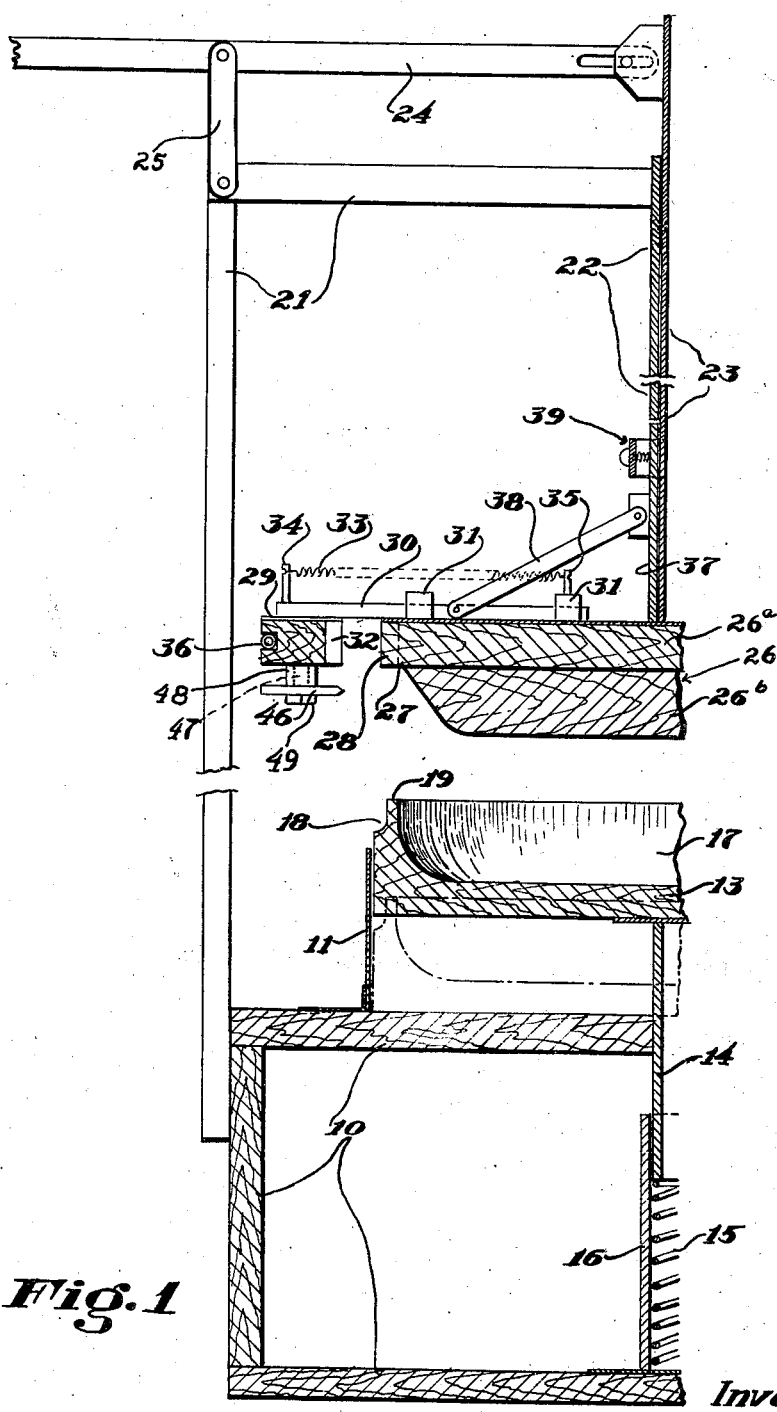
Fig.1
Inventor
Wendall M. Fletcher
Attorneys Aug. 13, 1946.   W. M. FLETCHER   2,405,781
PIE CRUST OR LIKE FORMER
Filed April 7, 1945   3 Sheets-Sheet 2

Inventor
Wendall M. Fletcher
By Spear&Spear
Attorneys

Patented Aug. 13, 1946

2,405,781

UNITED STATES PATENT OFFICE 2,405,781

PIECRUST OR LIKE FORMER

Wendall M. Fletcher, Portland, Maine

Application April 7, 1945, Serial No. 587,084

12 Claims. (Cl. 107—15)

My present invention relates to apparatus adapted to perform such operations, for example, as shaping of dough to establish an upstanding wall on the rim of a pie plate.

One of the serious problems in a bakery results from the requirement that the crust of certain types of pies establishes a wall on the rim of the pie plate. Shaping of the dough by hand to provide such a wall is objectionable because of the time required and because of the difficulty in securing uniform results, both as to appearance and as to the weight of the filling that the shaped dough will receive. While apparatus has been made to form such pie crusts, it is not wholly acceptable because of its size, cost, and mode of operation.

In accordance with my invention, my apparatus for forming the dough as an upstanding wall on the rim of a pie plate consists of a base on which is an annular receiver, the diameter of which is substantially that of the pie plate. Within the receiver I resiliently mount a support to have a normal position protruding from the receiver to support a pie plate with the marginal dough from which the wall is to be formed hanging downwardly over the upper part of the outer surface of the receiver.

My apparatus also includes forming means reciprocable between an inoperative position remote from the receiver and a position in which it seats the pie plate and the support a predetermined distance below the upper edge of the receiver.

The forming means includes a plate engaging member of substantially the size and shape of the pie plate and the periphery of its rim engaging portion is the first wall shaping surface. The member carries a plurality of arcuate elements for radial movement in a plane between an inoperative position in which the elements are spaced from each other and the first shaping surface and an operative position in which they abut each other to establish a second annular shaping surface to cooperate with the first shaping surface in the formation of the wall. Where a "printed" wall is wanted, both shaping surfaces are complementally formed to establish the desired design.

Each of the arcuate elements supports an arcuate knife section a predetermined distance below its bottom edge and is under the influence of a spring urging it into its operative position. Means are also provided to position and hold the arcuate elements in their inoperative position against the influence of the springs.

When the forming means are lowered to seat the support and the pie plate supported thereby within the receiver, the holding means maintains the arcuate elements inoperatively. During this movement of the forming means, the marginal dough is shaped over the upper edge of the receiver in a plane above the rim of the pie plate as a partially formed wall. On the release of the holding means, the arcuate elements are urged radially inwardly by the spring but are held in spaced relation with the first forming surface by the knife sections which cut excess dough against the receiver wall. As the forming means are raised towards said inoperative position, the knife sections serve as a support to raise the partially formed wall as the support raises the pie plate. As the forming means continue to rise, the knife sections clear the top of the receiver and extend under and support the rim of the pie plate as the second wall shaping surfaces move into coacting relation with the first shaping surfaces to finish the shaping of the wall. The pie plate is accordingly raised with the forming means from the support and held until released by the actuation of the holding means to position the arcuate elements inoperatively.

In the accompanying drawings I have shown an embodiment of my invention from which these and other of its novel features and advantages will be readily apparent.

In the drawings:

Fig. 1 shows one embodiment of my apparatus in a fragmentary vertical section.

Figure 2:
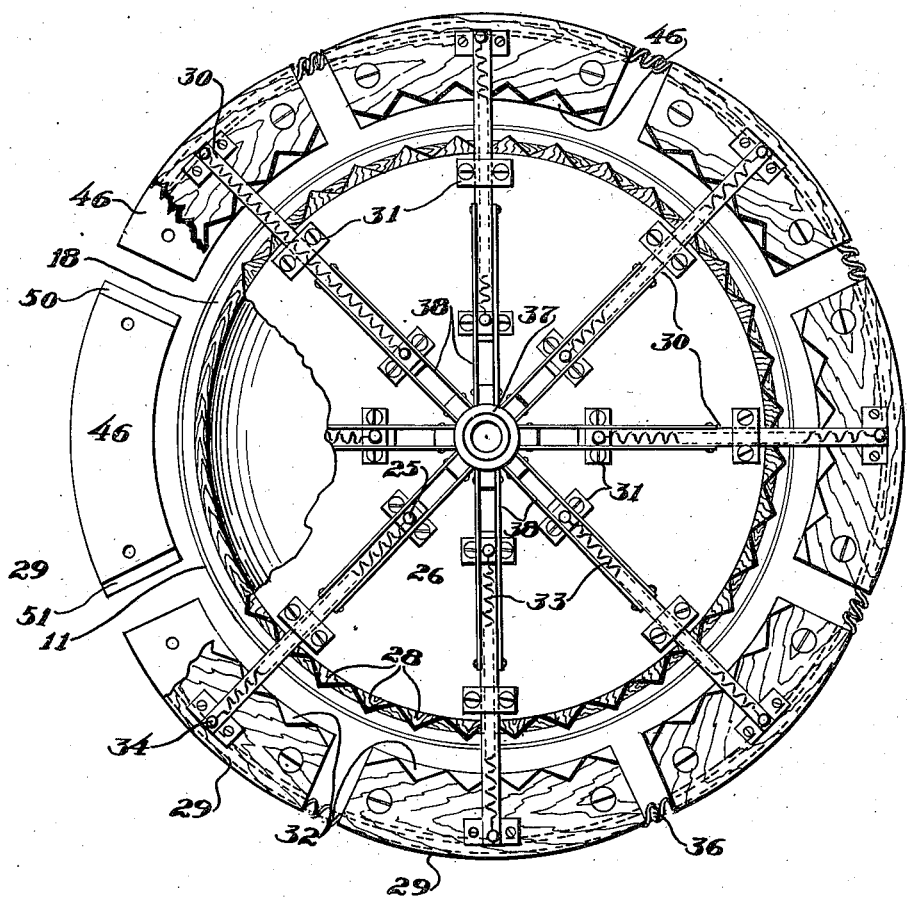
Fig. 2 is a partly sectioned plan view of the receiver, support and forming means.

In the drawings, I have illustrated my invention as embodied in light weight apparatus of inexpensive construction. It comprises a base 10 on which I mount a receiver 11, the inside diameter of which is slightly greater than that of the pie plate 12.

Figure 3:
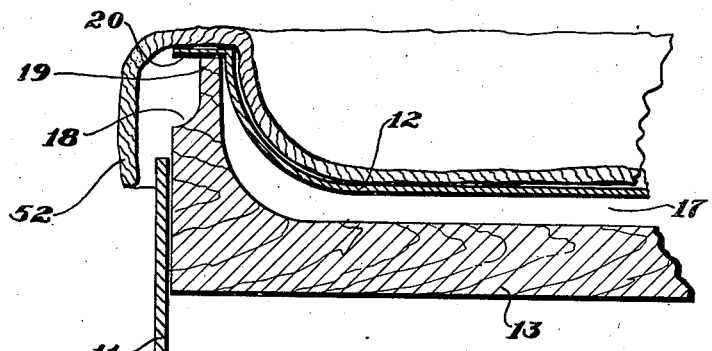
Fig. 3 is a fragmentary view of a pie plate positioned in the support and showing its relation to the receiver.
Figure 4:
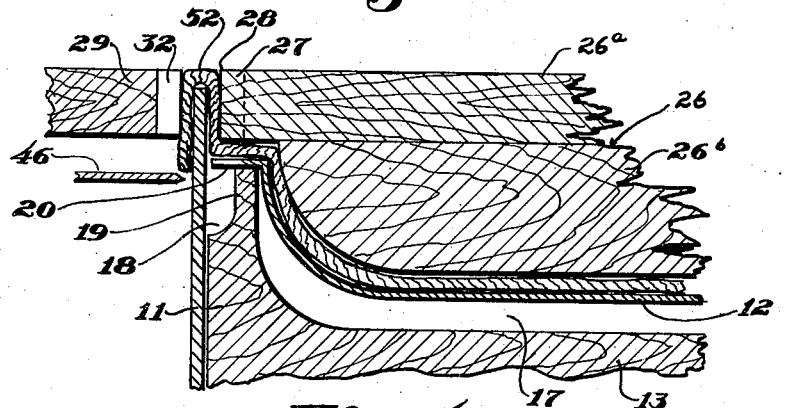
Fig. 4 shows in a similar view the positioning of the pie plate and support by the forming means to partially form the wall and the trimming of the dough with the arcuate sections held in spaced relation to the periphery of the plate engaging member.
Figure 5:
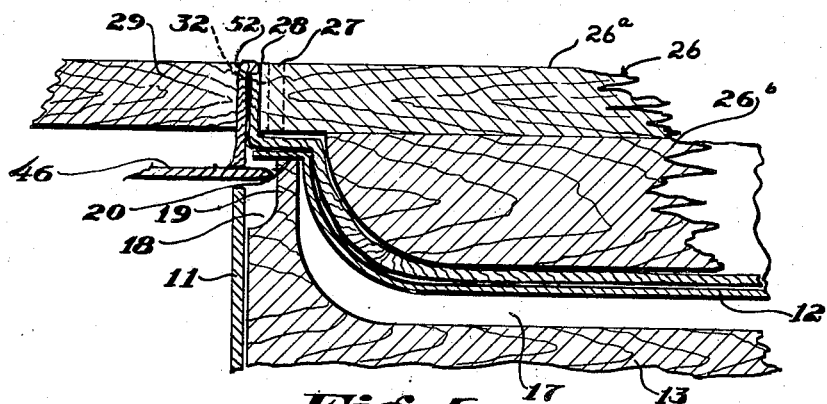
Fig. 5 is a similar view as the forming means are raised to permit the closing of the arcuate elements against the periphery of the forming member and the positioning of the knife sections to support the pie plate by its rim.

Within the receiver 11, I mount a support 13 on a stem 14 resiliently backed by a return spring 15 mounted within the tubular guide 16 attached to the base 10 so that the support 13 has a normal position in which it protrudes from the receiver 11 and may be seated on the frame 10 against the action of the return spring 15. The normal position of the support 13 is indicated by its full line position in Fig. 1 and is also shown in Fig. 3. In its seated position, the support 13 is below the upper edge of the receiver 11 as shown by its dotted line position in Fig. 1 and as shown in Fig. 4. The support 13 is dished out as at 17 to receive and support the pie plate 12 and has an external annular shoulder 18 establishing a rim 19 adapted to engage with and support the rim 20 of the pie plate 12.

The base 10 carries a frame 21 having a tubular guide 22 slidably receiving the stem 23 of the forming means. The stem 23 is pivotally connected to an operating handle 24 connected to the frame 21 by a link 25 so that the forming means may be raised and lowered into and out of its operative positions.

The forming means consists of a plate engaging member generally indicated at 26 fast on the lower end of the stem 23. The member 26 preferably consists of two parts, the part 26a fast on the stem 23 and the detachable section 26b which is of substantially the size and shape of the pie plate 12. For a pie plate of different shape, the section 26b is removed and another one of appropriate shape is substituted therefor. The marginal portion 27 of the member 26 is adapted to engage the rim 20 of the plate 12 and its periphery constitutes the first wall shaping surface indicated at 28.

At 29 I have indicated a plurality of arcuate elements each of which has an arm 30 slidable in guides 31 disposed so that the elements 29 may slide towards or away from the member 26 along radial paths. The inner edges 32 of the elements 29 constitute second wall shaping surfaces when operatively positioned with respect to the surface 28 and in abutment with each other. I have shown the surfaces 28 and 32 as complementally serrated to establish a serrated wall but they may obviously be otherwise shaped to establish desired "printing" effects.

Springs 33, anchored as at 34 to the elements 29 and as at 35 to the member 26, urge the elements 29 into their operative position and I have shown the outer edges of the elements 29 as grooved to receive the confining spring 36. Slidable on the stem 23 is a sleeve 37 to which and to each of the arms 30, links 38 are pivotally connected. The sleeve 37 slides upwardly on the stem 23 under the influence of the springs 33 and as the stem 23 is raised to position the holding means inoperatively with respect to the support 13, the sleeve 37 engages with the lower end of the fixed guide 22 so that on the completion of the upward stroke of the stem 23, the sleeve 37 is held thereby to position the elements 29 inoperatively as shown in Fig. 1.

Figures 6, 7:
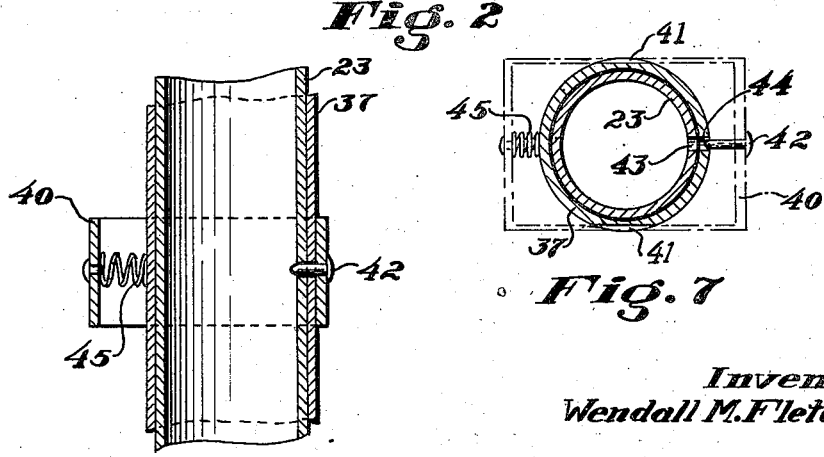
Figs. 6 and 7 are, respectively, vertical and horizontal sections of the holding means by which the arcuate elements are locked in their inoperative position.

When the holding means are in this position I provide means generally indicated at 39 in Fig. 1 to lock the sleeve 37 to the stem 23. The locking means 39 may, as shown in Figs. 6 and 7, conveniently comprise a slide 40 supported in grooves 41 transversely of the sleeve 37. The slide 40 has a locking pin 42 adapted to extend through holes 43, 44 in the sleeve 37 and the stem 23, respectively, which register in the position shown in Fig. 1. The locking means are preferably urged into locked position by the spring 45 and may be readily manually disengaged by pushing the slide 40 against the action of the spring 45.

Each of the elements 29 carries a knife section 46 supported below the plane defined by the lower edges of the elements 29. Preferably, the knife sections are adjustable with reference to the elements 29 and this may be readily effected by means of depending bolts 47 with the knife sections being clamped thereon between nuts 48 and 49. As shown in Fig. 2, certain of the knife sections 46 have extensions 50 and 51 disposed to extend under the ends of adjacent sections as the elements 29 move inwardly to permit the knife sections to establish an annular knife of the diameter of the receiver 11 and to establish an annular support of a diameter less than that of the plate 12.

The operation of apparatus in accordance with my invention will be readily apparent by first considering Fig. 1. In Fig. 1, the plate engaging member 26 and the arcuate elements 29 are spaced inoperatively relative to each other and to the support 13 which is positioned above the upper edge of the receiver 11 by the spring 15. A pie plate 12 is then placed on the support 13 with the marginal portions 52 of its dough hanging downwardly over the receiver as shown in Fig. 3.

The handle 24 is then actuated to lower the forming means so that the plate engaging member 26 engages the plate 12 and carries it and its support 13 into its seated position. As is shown in Fig. 4, the marginal portions 51 of the dough are then disposed over the inner and outer surfaces of the receiver 11 adjacent its upper end thereby partially forming the wall above the plane defined by the rim 20 of the pie plate 12.

The lock 39 holding the elements 29 in their inoperative position is then released so that the elements 29 move radially inwardly towards the member 26 until held spaced therefrom by the engagement of the knife sections 46 with the wall of the receiver 11. When the knife sections 46 engage the receiver 11, they establish a substantially annular knife trimming the excess dough.

The handle 24 is next actuated to raise the stem 23 thereby to raise the holding means. Until the knife sections 46 clear the upper end of the receiver 11, they serve to establish an annular support to raise the partially formed wall from the receiver 11 and as the forming means are raised, the support 13 follows under the influence of the spring 15.

As soon as the knife sections 46 clear the upper edge of the receiver 11, they move inwardly under the rim 20 of the pie plate 12 as an annular support and the wall shaping surfaces 32 of the elements 29 come into operative relation relative to the wall shaping surface 28 of the member 26 to finish the shaping of the wall.

As upward movement of the forming means is continued, the pie plate 12 is carried upwardly with the forming means on the annular support established by the knife sections 46 until contact of the sleeve 37 with the guide 22 positions the arcuate elements 29 inoperatively in which position they are held by the lock 39. The released pie plate is then removed and replaced.

From the foregoing, it will be apparent that my invention makes possible light weight apparatus of a simple and inexpensive construction providing ease, reliability and accuracy of operation.

What I therefore claim and desire to secure by Letters Patent is:

1. Apparatus for shaping moldable material disposed over a device as an upstanding wall adjacent the margin of the device, said apparatus comprising a base, an annular receiver on said base of a diameter to receive the device, a support resiliently mounted in said receiver to have a normal position protruding from said receiver to support the device with the margins of the material hanging downwardly over the outside of said receiver, forming means reciprocably mounted on said base for movement into and out of engagement with the device on said support to seat said support in said receiver below its upper edge whereby the material draped over said receiver is raised relative to the device to partially form the wanted wall, said forming means comprising a member of substantially the size and shape of said device, the periphery of said member constituting a first wall-shaping surface, a plurality of elements having inner edges constituting second wall-shaping surfaces and being supported by said member for radial movement into and out of abutment with each other to bring said shaping surfaces into operative relation to each other, a knife section carried by each of said elements below its lower edge, means to hold said elements in an inoperative position relative to each other and to said member, resilient means urging said elements into abutment, said knife sections engaging with said receiver to trim the material when said forming means are positioned to seat said support and said holding means are released to raise said partially formed wall as said forming means are raised and said support returned to its normal position, and to extend under and support the margin of said device as said forming means completes said wall and said forming means are moved out of contact with said support.

2. Apparatus for shaping dough on the rim of a pie plate as an upstanding wall, said apparatus comprising a base, an annular receiver on said base of a diameter to receive the plate, a support resiliently mounted in said receiver to have a normal position protruding from said receiver to support the pie plate with the margins of the dough hanging downwardly over the outside of said receiver, forming means reciprocably mounted on said base for movement into and out of engagement with the device on said support to seat said support in said receiver below its upper edge whereby the dough draped over said receiver is raised relative to the rim of the plate to partially form the wanted wall, said forming means comprising a member of substantially the size and shape of said plate, the periphery of the rim engaging portion of said member constituting a first wall-shaping surface, a plurality of elements having arcuate inner edges constituting second wall-shaping surfaces and being supported by said member for radial movement into and out of abutment with each other to bring said shaping surfaces into operative relation to each other, an arcuate knife section carried by each of said elements below its lower edge, means to hold said elements in an inoperative position relative to each other and to said member, resilient means urging said elements into abutment, said knife sections engaging with said receiver to trim the dough when said forming means are positioned to seat said support and said holding means are released, to raise said partially formed wall as said forming means are raised and said support returned to its normal position, and to extend under and support said plate rim as said forming means completes said wall and said forming means are moved out of contact with said support.

3. The apparatus of claim 2 in which the knife sections are vertically adjustable with respect to the elements.

4. The apparatus of claim 2 in which the ends of the knife sections extend beyond the ends of the elements to establish a substantially annular knife for engagement with the receiver, the ends of at least certain of the knife sections having shouldered extensions to extend under adjacent ends of adjacent knife sections to establish a substantially annular support of lesser diameter than the receiver for engagement with the rim of the pie plate.

5. The apparatus of claim 2 in which the support has a stem, the base has a guide to receive the stem, and a stem supporting spring is housed in the guide.

6. The apparatus of claim 2 in which the support is dished out and has an annular shoulder thereby to establish an upstanding rim to engage with the rim of the pie plate.

7. Apparatus for shaping dough on the rim of a pie plate as an upstanding wall, said apparatus comprising a base, an annular receiver on said base of a diameter to receive the plate, a support resiliently mounted in said receiver to have a normal position protruding from said receiver to support the pie plate with the margins of the dough hanging downwardly over the outside of said receiver, forming means reciprocably mounted on said base for movement from an inoperative position remote from said support into and out of engagement with the plate on said support to seat said support in said receiver below its upper edge whereby the dough draped over said receiver is raised relative to the rim of the plate to partially form the wanted wall, said forming means comprising a reciprocable stem, a member of substantially the size and shape of said plate on the lower end of said stem, the periphery of the rim engaging portion of said member constituting a first wall shaping surface, a plurality of elements having arcuate inner edges constituting second wall-shaping surfaces and being supported by said member for radial movement into and out of abutment with each other to bring said shaping surfaces into operative relation to each other, an arcuate knife section carried by each of said elements below its lower edge, means slidable on said stem to position and to hold said elements in an inoperative position relative to each other and to said member, resilient means urging said elements into abutment, said holding means being operative when said forming means is in said inoperative position, said knife sections engaging with said receiver to trim the dough when said forming means are positioned to seat said support and said holding means are released, to raise said partially formed wall as said forming means are raised and said support returned to its normal position, and to extend under and support said plate rim as said forming means complete said wall and said forming means are moved out of contact with said support.

8. The apparatus of claim 7 in which a guide slidably supports the stem and the slidable means on the stem engages the lower end of the guide and is held thereby to be actuated by relative movement between it and the stem as the stem is raised.

9. The apparatus of claim 7 in which a guide slidably supports the stem, the stem and the slidable means each have holes registering when the forming means are inoperatively positioned, a manually operable slide is transversely supported by the slidable means and has a pin to enter the holes when in registry and a spring urging the pin into locking position, the slidable means being engaged by and held by the lower end of the guide to be actuated by relative movement between it and the stem as the stem is raised to position the forming means inoperatively and to bring the holes into registry.

10. Apparatus for shaping dough on the rim of a pie plate as an upstanding wall, said apparatus comprising a base, an annular receiver on said base of a diameter to receive the plate, a support resiliently mounted in said receiver to have a normal position protruding from said receiver to support the pie plate with the margins of the dough hanging downwardly over the outside of said receiver, forming means reciprocably mounted on said base for movement into and out of engagement with the plate on said support to seat said support in said receiver below its upper edge whereby the dough draped over said receiver is raised relative to the rim of the plate to partially form the wanted wall, said forming means comprising a reciprocable stem, a member of substantially the size and shape of said plate, the periphery of the rim engaging portion of said member constituting a first wall shaping surface, a plurality of elements having arcuate inner edges constituting a second wall-shaping surface, an arm on each of said elements, radially disposed guides for each of said arms on said member, and a spring connecting each of said elements to said member urging said elements into abutment with each other to bring said first and second shaping surfaces into operative relation to each other, an arcuate knife section carried by each of said elements below its lower edge, a sleeve slidable on said stem and links pivotally connected to said sleeve and each of said arms, said springs normally holding said sleeve a predetermined distance above said member but yielding on movement of said stem upwardly with reference to said sleeve to position and hold said elements in an inoperative position relative to each other and to said member, a lock to hold said sleeve to said stem when said elements are inoperatively positioned relative to said member, said knife sections engaging with said receiver to trim the dough when said forming means are positioned to seat said support and said lock is released to raise said partially formed wall as said forming means are raised and said support returned to its normal position, and to extend under and support said plate rim as said forming means complete said wall and said forming means are moved out of contact with said support.

11. The apparatus of claim 10 in which a restraining spring engages the outer surfaces of each of the elements.

12. The apparatus of claim 10 in which the stem is slidable in a guide and the guide engages the slidable means to effect the inoperative position of the elements relative to the member as the stem is raised.

WENDALL M. FLETCHER.